United States Patent [19]

Wakimoto et al.

[11] Patent Number: 5,122,711
[45] Date of Patent: Jun. 16, 1992

[54] ELECTROLUMINESCENT DEVICE

[75] Inventors: Takeo Wakimoto; Masanao Shinkai; Hitoshi Nakada, all of Saitama, Japan

[73] Assignee: Pioneer Electronic Corporation, Tokyo, Japan

[21] Appl. No.: 402,579

[22] Filed: Sep. 5, 1989

[30] Foreign Application Priority Data

Feb. 17, 1989 [JP] Japan .................. 1-37740

[51] Int. Cl.$^5$ .............................. H05B 33/14
[52] U.S. Cl. .............................. 313/504
[58] Field of Search ........................ 313/504

[56] References Cited

U.S. PATENT DOCUMENTS

| 4,356,429 | 10/1982 | Tang ................. | 313/504 X |
| 4,720,432 | 1/1988 | Van Slyke et al. ........ | 313/504 X |
| 4,769,292 | 9/1988 | Tang et al. ........... | 313/504 X |
| 4,775,820 | 10/1988 | Eguchi et al. .......... | 313/504 |

OTHER PUBLICATIONS

Tang, C. W. et al., "Electroluminescence of Doped Organic Thim Film", J. Appl. Phys. 65(9), May 1, 1989, pp. 3610-3616.

Primary Examiner—Palmer C. DeMeo
Attorney, Agent, or Firm—Sughrue, Mion, Zinn, Macpeak & Seas

[57] ABSTRACT

An electroluminescent device comprising a fluophor luminescent layer and a hole transport layer respectively composed of organic compounds and laminated to each other disposed between a cathode and an anode, said fluophor luminescent layer comprising a pair of fluophor thin films laminated in each other, the material of the cathode-side film having a larger electron transport capacity than the material of the anode-side film.

5 Claims, 1 Drawing Sheet

ELECTROLUMINESCENT DEVICE

FIELD OF THE INVENTION

The present invention relates to an electroluminescent device and, particularly, relates to an electroluminescent device including organic compounds as a luminescent substance.

BACKGROUND OF THE INVENTION

Electroluminescent devices which are known include a two-layer structure in which an organic fluophor thin film 3 and an organic hole transport layer 4, respectively, composed of organic compounds and laminated on each other are disposed between a metal electrode 1, as a cathode, and a transparent electrode 2, as an anode, as shown in FIG. 2, and a three-layer structure in which an organic electron transport layer 5, an organic fluophor thin film 3, and an organic hole transport layer 4 laminated one on one are disposed between a metal electrode 1 and a transparent electrode 2, as shown in FIG. 3. The organic hole transport layer 4 has the double function of making holes injected easily from the anode and blocking electrons. The organic electron transport layer 5 has the function of making it easy for electrons to be injected from the cathode.

In this type of electroluminescent device, a glass substrate 6 is disposed outside of the transparent electrode 2. Excitons are produced by recombination of electrons injected from the metal electrode 1 and holes injected from the transparent electrode 2, so that light is emitted as radiation and inactivation of the excitons and discharged externally through the transparent electrode 2 and the glass substrate 6.

In the conventional electroluminescent devices configured as described above, the lifetime of the device depends on the chemical stability of the fluorescent substance, so that the chemical stability changes easily with the passage of time. Accordingly, a disadvantage arises in that the device deteriorates easily. Further, a disadvantage arises in that luminescent efficiency is too low to obtain luminescence with high brightness.

SUMMARY OF THE INVENTION

An object of the present invention is to provide an electroluminescent device in which the fluophor can be made luminous with high efficiency and high brightness and in which the lifetime of the device can be improved to thereby eliminate the aforementioned disadvantages in the prior art.

The electroluminescent device according to the present invention comprises a fluophor luminescent layer laminated on an organic hole transport layer and disposed between a cathode and an anode and the luminescent layer comprises a pair of fluophor thin films laminated on each other, the cathode-side film having a larger electron transport capacity than the anode-side film.

DETAILED DESCRIPTION OF THE INVENTION

The present invention will be described in detail hereunder by reference to a preferred embodiment thereof.

Figure 1:
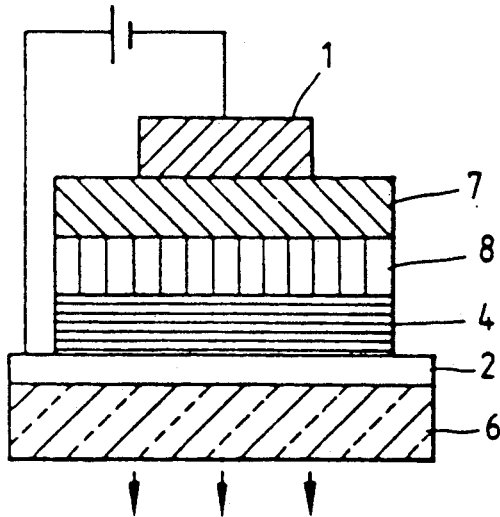
FIG. 1 a configurational view showing an embodiment of the present invention.
Figure 2:
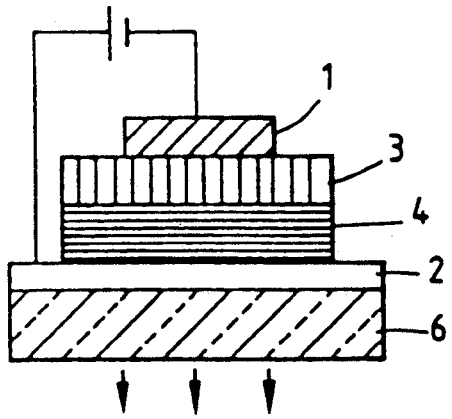
FIGS. 2 and 3 are configurational views showing conventional examples of electroluminescent devices wherein 1 is a metal electrode (cathode); 2 is a transparent electrode (anode); 4 is a organic hole transport layer; 5 is an organic electron transport layer; 6 is a glass substrate; and 7 and 8 are each an organic fluophor thin film.
Figure 3:
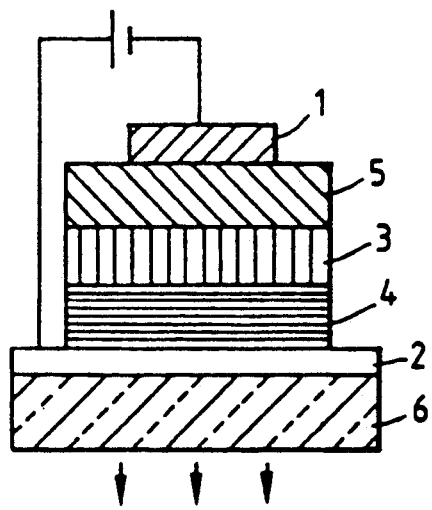

FIG. 1 is a configurational view showing an embodiment of the present invention. In FIG. 1, elements equivalent to those in FIG. 3 are referenced correspondingly. In the drawing, the material used for the metal electrode 1 as a cathode is a metal having a small work function, such as aluminum, magnesium, indium or silver, in a thickness of about 500–4000 Å. The material used for the transparent electrode 2 as an anode is an electrically conductive material having a large work function, such as indium-tin oxide (ITO) of a thickness of about 1000–3000 Å or gold of a thickness of about 800–1500 Å. Where gold is used as the electrode material, the electrode 2 becomes semitransparent.

A pair of organic fluophor thin films 7 and 8 and an organic hole transport layer 4 laminated in descending order in the drawing are disposed between the metal electrode 1 and the transparent electrode 2. Of the pair of organic fluophor thin films 7 and 8, the cathode-side organic fluophor thin film 7 has a larger capability of injecting electrons easily from the cathode, that is, electron transport capacity, than the anode-side organic fluophor thin film 8. For example, a metal complex of 8-hydroxyquinoline can be used as the material for the organic fluophor thin film 7 in order to recombine electrons and holes effectively to produce excitons. The metal used in the metal complex can be selected from the group consisting of Al, Ga, In, Mg, and Zn. In this case, the material used for the organic fluophor thin film 8 is selected from the group consisting of coumarin compounds such as coumarin 540, coumarin 515 and coumarin 535, and perylene compounds such as LUMOGEN F ORANGE 240 (tradename) made by BASF Co., Ltd., and the like. The thickness of each of the thin films 7 and 8 is about 200–1000 Å. The total thickness of the pair of organic fluophor thin films 7 and 8 is not more than about 1 μm.

The structural formula of coumarin 540 is as follows.

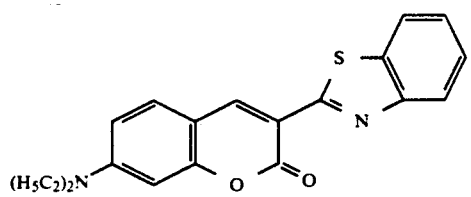

The structural formula of coumarin 515 is as follows.

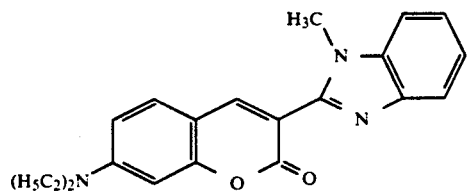

The structural formula of coumarin 535 is as follows.

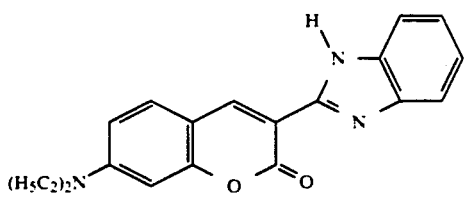

When tris(8-hydroxyquinolinol) aluminum is used as the material for the cathode-side organic fluophor thin film 7, the above-described materials used for the organic fluophor thin film 8 have light-emission characteristics as follows. Coumarin 540 has the characteristics of an emitted light wavelength of 600 nm, a maximum brightness of 880 cd/m² and a drive voltage of 30 V. Coumarin 515 has the characteristics of an emitted light wavelength of 510 nm, a maximum brightness of 1900 cd/m² and a drive voltage of 30 V. Coumarin 535 has the characteristics of an emitted light wavelength of 590 nm, a maximum brightness of 868 cd/m² and a drive voltage of 30 V.

Further, 4-(dicyanomethylene)-2-methyl-6-(p-dimethylaminostyryl)-4H-pyran can be used as the material for the organic fluophor thin film 8. The structural formula of this compound is as follows.

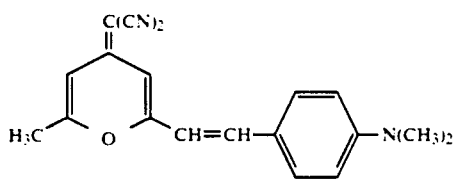

4-(Dicyanomethylene)-2-methyl-6-(p-dimethylaminostyryl)-4H-pyran has the light-emission characteristics of an emitted light wavelength of 665 nm, a maximum brightness of 214 cd/m² and a drive voltage of 30 V, when tris(8-hydroxyquinolinol)aluminum is used as the material for the cathode-side organic fluophor thin film 7.

Further, bisdiphenylamine derivatives can be used for the organic hole transport layer 4. For example, a thin film of a thickness of 800 Å of a compound represented by the following formula (I) can be used.

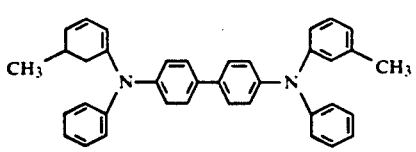

(I)

Further, compounds represented by the following formulae and known as CTMs (carrier transmitting materials) can be used for the organic hole transport layer 4.

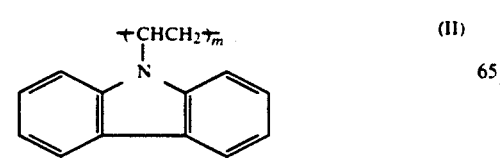

(II)

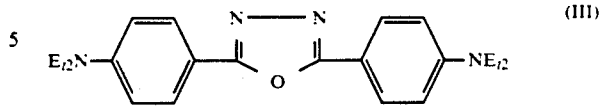

(III)

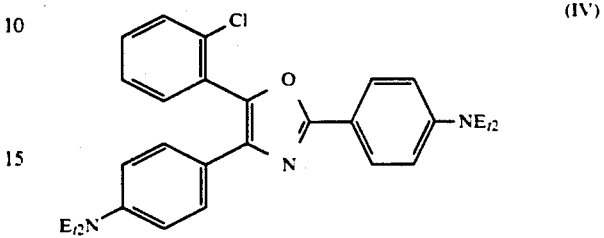

(IV)

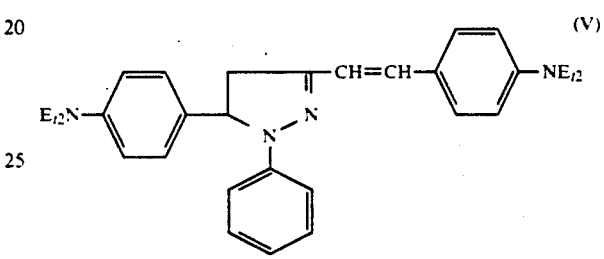

(V)

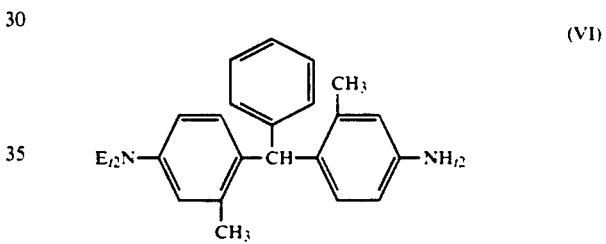

(VI)

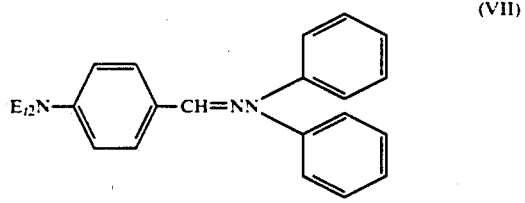

(VII)

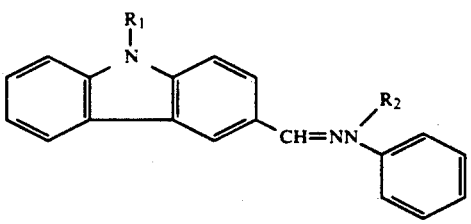

(VIII)

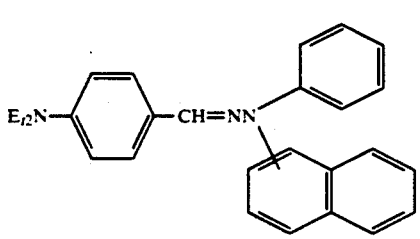

(IX)

-continued

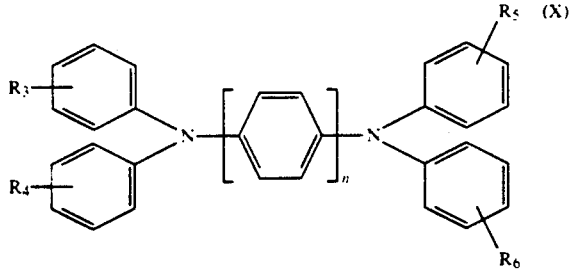

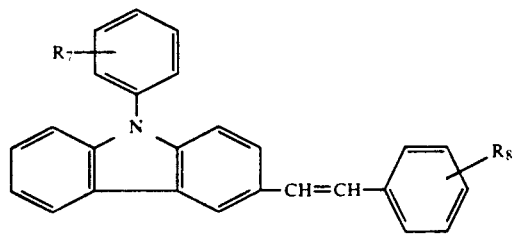

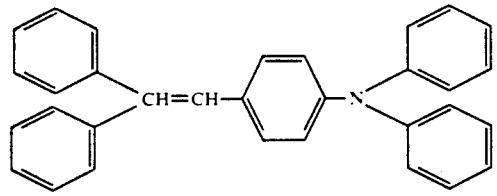

where $Et = C_2H_5$, $R_1-R_8$ are alkyls of carbon atom number 1,2,3, or 4 and m and n are integers (1 to 3).

The respective thin films in the electroluminescent device constructed as described above are formed by a method of vacuum evaporation under the conditions of a vacuum degree of $2 \times 10^{-5}$ Torr or less and an evaporation speed of 0.1 to 20.0 Å/sec.

In the electroluminescent device thus produced, the organic fluophor thin film 7 comprising a metal complex of 8-hydroxyquinoline serves as an electron transport material and produces excitons by effective recombination of electrons and holes in the organic fluophor thin film 7 to thereby move the excitation energy to the other organic fluophor thin film 8. The organic fluophor thin film 8 thus receiving the excitation energy fluoresces in the process of radiation and inactivation of the excitons and then returns to the ground state. Emitted light is discharged externally through the transparent electrode 2 and the glass substrate 6.

As described above, the fluophor luminescent layer is composed of a pair of organic fluophor thin films 7 and 8 in which the materials are selected so that the cathode-side material has a larger electron transport capacity than the anode-side material. By this selection, a large current can be passed to thereby cause the fluophor to fluoresce with high efficiency and high brightness. Further, the chemical stability of the anode-side organic fluophor thin film 8 can be protected by the cathode-side organic fluophor thin film 7, so that the lifetime of the device can be improved. In particular, by use of tris(8-hydroxyquinolinol) aluminum as the material for the cathode-side organic fluophor thin film 7, the brightness is increased by about twice that of the device not using such a material. Further, by use of 4-(dicyanomethylene)-2-methyl-6-(p-dimethylaminostyryl)-4H-pyran as the material for the anode-side organic fluophor thin film 8, the brightness is increased by about twice or more that of the conventional device having a two-layer structure.

Although the above-described embodiment has been described with reference to the use of tris(8-hydroxyquinolinol) aluminum as the material for the cathode-side organic fluophor thin film 7, the invention can be employed where tris(8-hydroxyquinolinol) aluminum is used as the material for the anode-side organic fluophor thin film 8. In this case, LUMOGEN F YELLOW 083 (tradename) made by BASF Co., Ltd., as a perylene compound, can be used as the material for the cathode-side organic fluophor thin film 7, by which the electron transport capacity of the cathode-side film can be increased to a level greater than that of the anode-side film in the same manner as in the above-described embodiment. LUMOGEN F YELLOW 083 has the characteristics of an emitted light wavelength of 660 nm, a maximum brightness of 110 cd/m$^2$ and a drive voltage of 30 V.

As described above, in the electroluminescent device according to the present invention, the fluophor luminescent layer laminated on the organic hole transport layer and disposed between the cathode and the anode comprises a pair of fluophor thin films in which the cathode-side material has a larger electron transport capacity than the anode-side material. Accordingly, not only can the fluophor be made to fluoresce with high efficiency and high brightness, but also the lifetime of the device can be improved.

While the invention has been described in detail and with reference to specific embodiments thereof, it will be apparent to one skilled in the art that various changes and modifications can be made therein without departing from the spirit and scope thereof.

What is claimed is:

1. An electroluminescent device comprising a fluophor luminescent layer and a hole transport layer respectively composed of organic compounds and laminated to each other disposed between a cathode and an anode, said fluophor luminescent layer comprising a pair of fluophor thin films laminated on each other, the material of the cathode-side fluophor luminescent thin film having a larger electron transport capacity than the material of the anode-side fluophor luminescent thin film.

2. An electroluminescent device according to claim 1, wherein the cathode-side fluophor luminescent thin film comprises a film of a metal complex of 8-hydroxyquinoline.

3. An electroluminescent device according to claim 2, wherein the anode-side fluophor luminescent thin film comprises a film of a member selected from the group consisting of coumarin 540, coumarin 515, coumarin 535, LUMOGEN F ORANGE 240, and 4-(dicyanomethylene)-2-methyl-6-(p-dimethylaminostyryl)-4H-pyran.

4. An electroluminescent device according to claim 1, wherein the cathode-side fluophor luminescent thin film comprises a film of LUMOGEN F YELLOW 083.

5. An electroluminescent device according to claim 4, wherein the anode-side fluophor luminescent thin film comprises a film of a metal complex of 8-hydroxyquinoline.

* * * * *